US008171617B2

(12) United States Patent
Vangala

(10) Patent No.: US 8,171,617 B2
(45) Date of Patent: May 8, 2012

(54) METHOD OF MAKING A WAVEGUIDE

(75) Inventor: Reddy R. Vangala, Albuquerque, NM (US)

(73) Assignee: CTS Corporation, Elkhart, IN (US)

( * ) Notice: Subject to any disclaimer, the term of this patent is extended or adjusted under 35 U.S.C. 154(b) by 42 days.

(21) Appl. No.: 12/460,710

(22) Filed: Jul. 23, 2009

(65) Prior Publication Data

US 2010/0024973 A1 Feb. 4, 2010

Related U.S. Application Data

(60) Provisional application No. 61/137,725, filed on Aug. 1, 2008.

(51) Int. Cl.
*G02B 6/10* (2006.01)

(52) U.S. Cl. ........................... 29/600; 385/131; 333/248

(58) Field of Classification Search .................... 29/600, 29/601, 830, 846–847, 592.1, 594; 385/131–132; 343/770–771; 333/237, 248
See application file for complete search history.

(56) References Cited

U.S. PATENT DOCUMENTS

| | | | | |
|---|---|---|---|---|
| 4,609,892 | A | 9/1986 | Higgins, Jr. | |
| 4,940,955 | A | 7/1990 | Higgins, Jr. | |
| 5,285,570 | A | 2/1994 | Fulinara | |
| 5,288,351 | A | 2/1994 | Hoang et al. | |
| 5,365,203 | A | 11/1994 | Nakamura et al. | |
| 5,382,931 | A * | 1/1995 | Piloto et al. | 333/208 |
| 5,416,454 | A | 5/1995 | McVeety | |
| 5,729,239 | A * | 3/1998 | Rao | 343/753 |
| 5,731,751 | A | 3/1998 | Vangala | |
| 5,830,591 | A * | 11/1998 | Sengupta et al. | 428/701 |
| 5,929,721 | A * | 7/1999 | Munn et al. | 333/134 |
| 6,154,106 | A * | 11/2000 | De Lillo | 333/210 |
| 6,329,890 | B1 | 12/2001 | Brooks et al. | |
| 6,568,067 | B2 * | 5/2003 | Takeda | 29/600 |
| 6,757,963 | B2 | 7/2004 | Meier et al. | |
| 6,791,403 | B1 | 9/2004 | Tayrani et al. | |
| 6,834,429 | B2 | 12/2004 | Blair et al. | |
| 6,844,861 | B2 * | 1/2005 | Peterson | 343/776 |
| 6,900,150 | B2 | 5/2005 | Jacquin et al. | |
| 6,909,345 | B1 * | 6/2005 | Salmela et al. | 333/239 |
| 7,805,826 | B1 * | 10/2010 | Spillane | 29/600 |
| 2004/0000968 | A1 | 1/2004 | White et al. | |
| 2004/0257194 | A1 | 12/2004 | Casey et al. | |

FOREIGN PATENT DOCUMENTS

| | | |
|---|---|---|
| WO | WO00/24080 | 4/2000 |

* cited by examiner

*Primary Examiner* — Minh Trinh
(74) *Attorney, Agent, or Firm* — Daniel J. Deneufbourg

(57) ABSTRACT

A method of making a ceramic waveguide delay line includes the step of providing several slices or slabs of dielectric material, each including a layer of metal material applied to respective opposed side surfaces thereof. The slices are then fired in an oven to fuse the layers of metal material to the slices. The slices are then stacked together to form a core which is then dried and subsequently fired. An area of metal material is applied to the outer surface of the core. The core is subsequently dried and fired in an oven.

4 Claims, 5 Drawing Sheets

METHOD OF MAKING A WAVEGUIDE

CROSS-REFERENCE TO RELATED APPLICATION

This application claims the benefit of the filing date of U.S. Provisional Application Ser. No. 61/137,725, filed on Aug. 1, 2008, which is explicitly incorporated herein by reference as are all references cited therein.

TECHNICAL FIELD

This invention relates to waveguide devices for radio-frequency signals and, more particularly, to a method of making a ceramic waveguide delay device.

BACKGROUND OF THE INVENTION

Waveguide devices and, more specifically, waveguide delay line devices are used to insert a pre-selected time delay into an electronic circuit, i.e., a device where the input signal reaches the output of the device after a known period of time has elapsed. Various types of delay lines have been used such as multi-layered ceramics, air lines, transmission lines on printed circuit boards, and air cavity waveguides. For higher frequency applications, waveguides are necessary to obtain acceptable levels of signal loss.

SUMMARY OF THE INVENTION

A method of making a ceramic waveguide delay line in accordance with the present invention initially includes the step of providing several slices or slabs of dielectric material, each including a layer of metal material applied to respective opposed side surfaces thereof. A screen printing process can be used to form areas on the surfaces of the slices which are devoid of metal material. The slices are then fired in an oven to fuse the layer of metal material to the slices. In lieu of the screen printing process, a laser could be used following the firing of the slices to remove metal material from the slices and form the areas on the surface of the slices which are devoid of metal material. The slices are then stacked together to form a core which is then dried and subsequently fired. An area of metal material is applied to the outer surface of the core. The core is subsequently dried and fired in an oven.

There are other advantages and features of this method, which will be more readily apparent from the following detailed description of the method, the drawings, and the appended claims.

BRIEF DESCRIPTION OF THE FIGURES

These and other features of the invention can best be understood by the following description of the accompanying drawings as follows.

DETAILED DESCRIPTION

Figure 1:
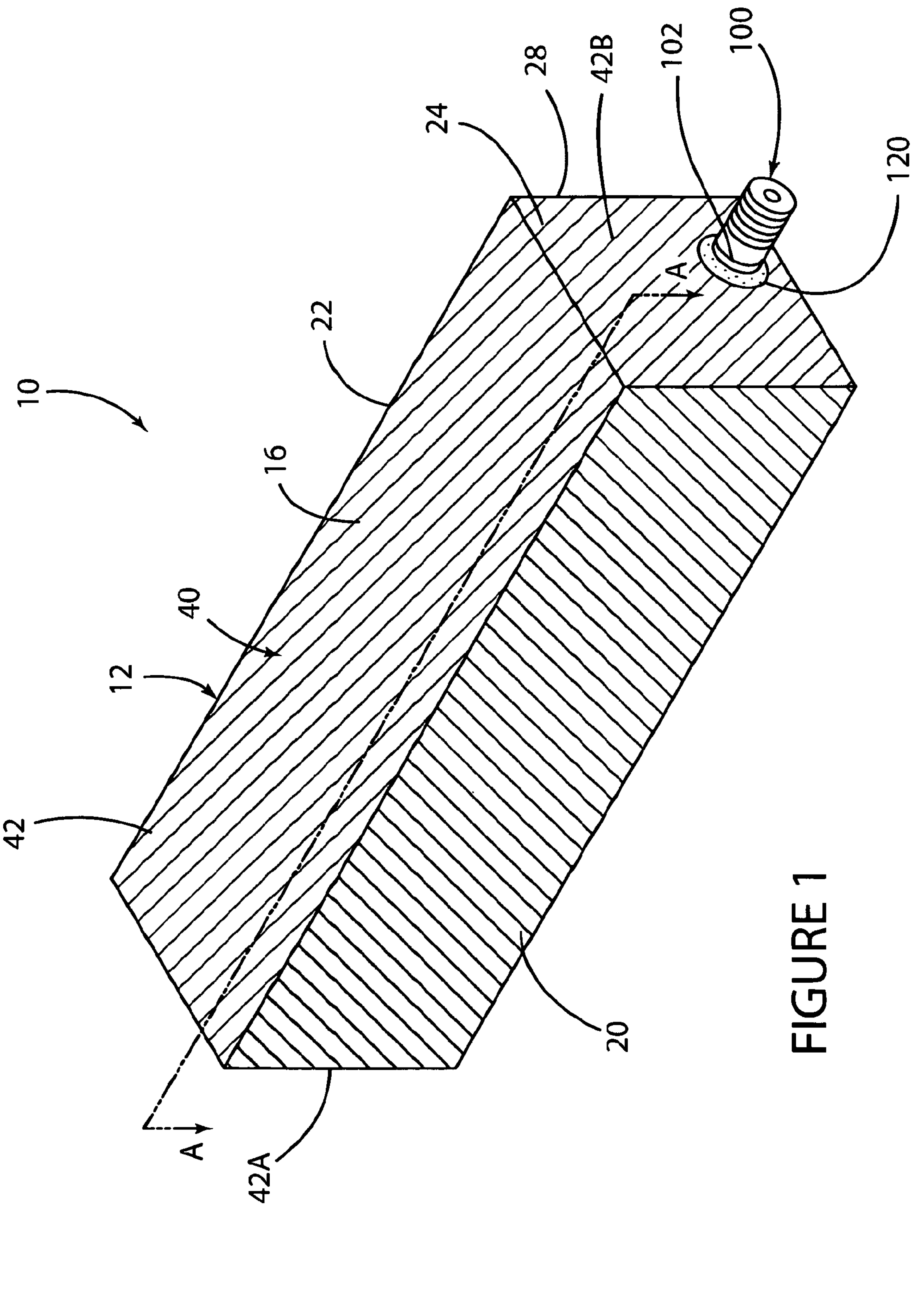
FIG. 1 is an enlarged perspective view of a dielectric waveguide delay line device.
Figure 2:
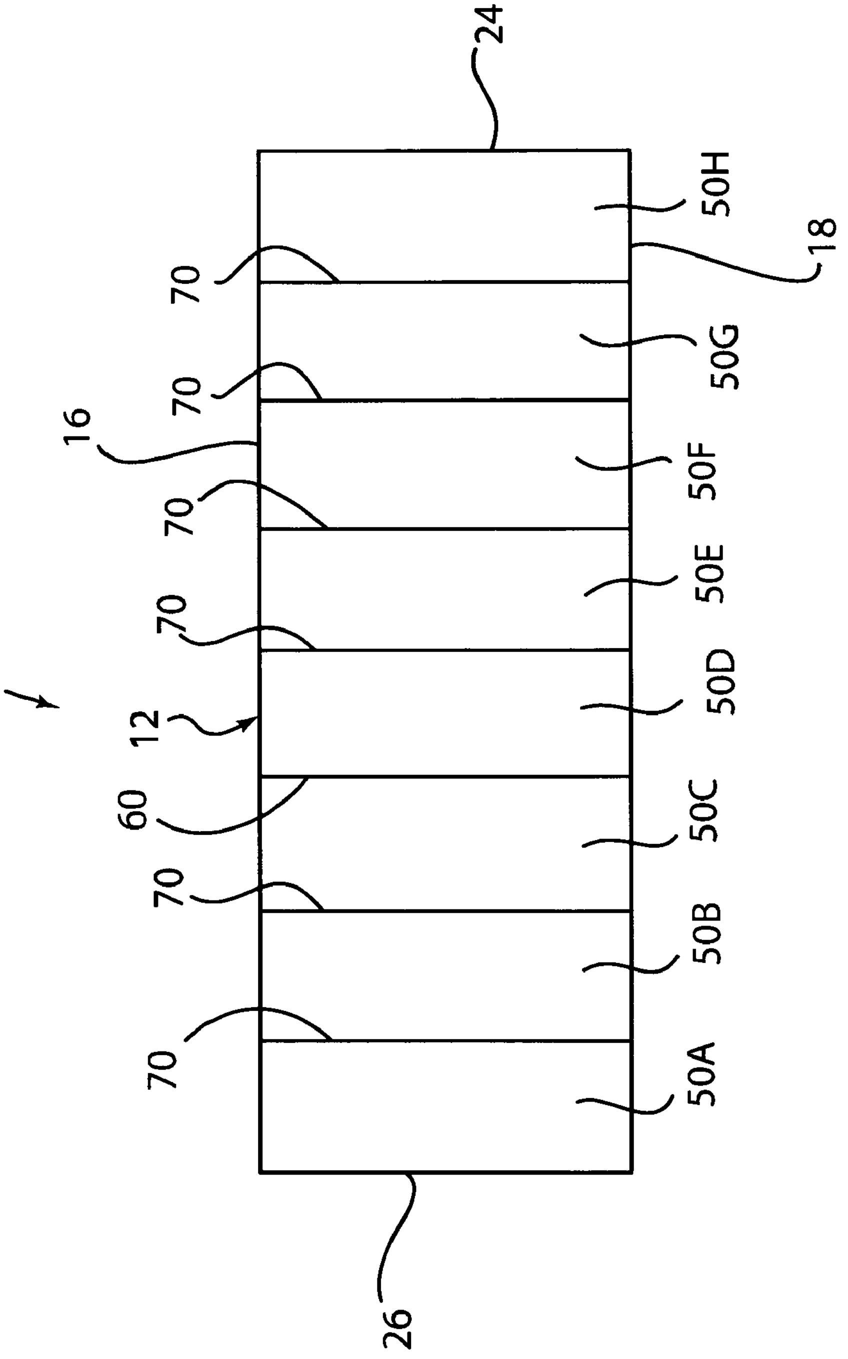
FIG. 2 is a simplified vertical cross-sectional view of the device of FIG. 1 taken along section line A-A in FIG. 1.

A waveguide delay line device or apparatus 10 is shown in FIGS. 1 and 2 which comprises an elongate, parallelepiped or box-shaped rigid core of ceramic dielectric material 12. Core 12 includes a top surface 16, a bottom surface 18, a first side surface 20, an opposite second side surface 22, an end surface 24, and an opposite end surface 26. Multiple vertical edges 28 are defined by the adjacent side surfaces of core 12.

Core 12 has an outer surface-layer pattern 40 of metallized and unmetallized areas or patterns. The metallized areas are preferably a surface layer of conductive silver-containing material. Pattern 40 includes a wide area or pattern of metallization 42 that covers all of top surface 16, all of bottom surface 18 (not shown), all of side surfaces 20 and 22 (not shown) and portions of end surfaces 24 and 26 to define a ground electrode and the outer or peripheral boundaries of the waveguide delay line device 10.

Core 12 is made of a plurality of generally rectangularly-shaped metallized dielectric walls or slabs 50A-50H (FIGS. 2-4) that have been stacked together in an abutting side-by-side relationship and separated by metal plates 70 (FIG. 2) disposed on opposite sides of the dielectric walls or slabs 50A-50H. Each metal plate 70 is comprised of separate metal plates 60 and 61 (FIG. 3) that become single metal plates 70 after all of the slabs 50A-50H have been bonded together during manufacturing as shown in FIG. 2.

In the embodiment shown, the core 12 is made of slabs 50A, 50B, 50C, 50D, 50E, 50F, 50G and 50H (FIG. 2). Each of the slabs 50A-H (of which the slabs 50E and 50H shown in FIGS. 3 and 4 respectively are representative) has opposed and parallel front and back surfaces 52 and 54, respectively; opposed and parallel top and bottom surfaces 55 and 56, respectively; and opposed and parallel side surfaces 57 and 58 (FIG. 4), respectively. While eight slabs are shown in the exemplified embodiment, more or fewer slabs can be used. For example, in one embodiment, twenty slabs may be used.

Metal plate 60 (FIG. 3) is defined by a layer of metallization that covers the front surface 52 of each of the slabs 50A-50H. Metal plate 61 (FIG. 3) is defined by a layer of metallization that covers the back surface 54 of each of the slabs 50A-50H.

Figure 3:
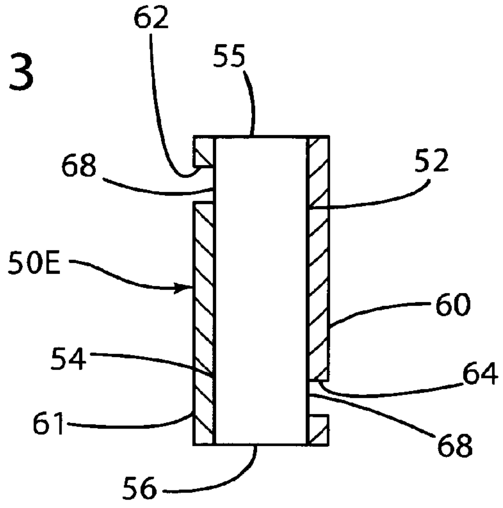
FIG. 3 is an enlarged vertical cross-sectional view of one of the dielectric walls of the device.

Each of the interior walls or slabs 50B-50G (of which slab 50E shown in FIG. 3 is representative) has a generally rectangularly-shaped upper window, area, or cutout 62 (FIG. 3) and a lower window, area, or cutout 64 (FIG. 3) formed in opposed plates 60 and 61, respectively (FIG. 3). Each of the windows 62 and 64 defines an unmetallized area or region 68 (FIG. 3) on each of the slab surfaces 52 and 54, i.e., regions 68 of exposed dielectric material.

Although not shown, it is understood that the slabs 50B-50G are adapted to be stacked in a relationship wherein the windows 62 and 64 are arranged in an alternating or staggered relationship that changes from one dielectric slab to the next adjacent dielectric slab. The windows 62 and 64 form a portion of the waveguide path for an electromagnetic wave adapted to propagate through the delay device 10.

End slab 50H (FIGS. 2 and 4) defines an input feed passage or conduit 84 (FIG. 4) that defines an interior metallized surface (not shown) that extends through the full interior of slab 50H and terminates in respective openings in the front and back surfaces 52 and 54 thereof.

Opposed outer end slab 50A (FIG. 2) likewise defines an interiorly metallized output feed passage or conduit (not shown), similar in structure to conduit 84 in slab 50H, that extends through the full interior of slab 50A and defines respective openings in the front and back surfaces 52 and 54 thereof.

Surface 54 of outer end slab 50H defines a layer or area of metallization 42B (FIG. 4) that defines a portion of, and is contiguous with metallized area 42. A generally circular area of metallization 82 (FIG. 4) completely surrounds the opening of feed passage 80. A generally circular-shaped unmetallized area 44 (FIG. 4) completely surrounds area of metallization 82.

Although not shown, it is understood that the metal defining the plate 61 on surfaces 52 of respective slabs 50A and 50H also is contiguous and unitary with the metal which covers the interior surface of the respective feed passages.

In accordance with the manufacturing process of the present invention, slabs 50A-H are joined together in an abutting relationship with the respective windows 62 and 64 in an overlying, aligned relationship and are then fired in a furnace such that the plates 60 and 61 on respective slabs 50A-50H bond or fuse together to form a single plate 70 between each of the dielectric walls or slabs 50A-5H. Each plate 70 is in electrical contact with metallization area 42 defined on the exterior surfaces of core 12 and contacts metallization area 42 at an outer edge of the plate along surfaces 16, 18, 20 and 22. Metallization area 42 is therefore electrically contiguous and connected with plates 70.

Figure 4:
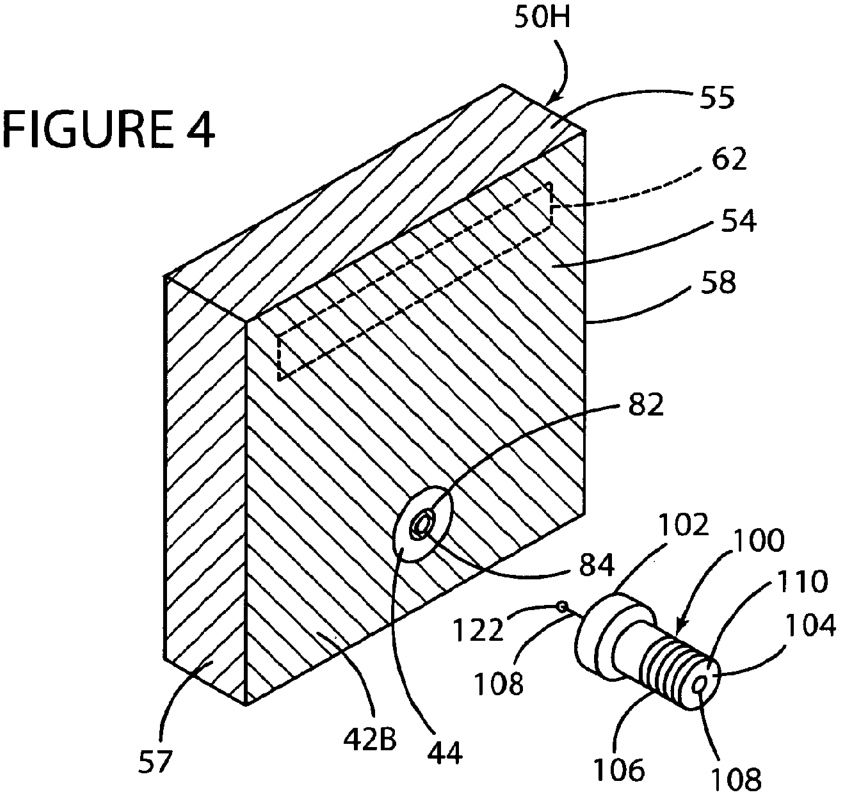
FIG. 4 is an enlarged, perspective, exploded view of one of the end slabs of the device of FIG. 1.

A coaxial male connector 100 (FIGS. 1 and 4) is mounted to each end of delay device 10 in order to provide a connection for electrical signals. FIGS. 1 and 4 show only one of the connectors 100 coupled to the outside face 54 of the slab 50H. Coaxial connector 100 has a metal outer flange 102 (FIG. 4), a terminal end 104 (FIG. 4), and a threaded outer surface 106 (FIG. 4) therebetween for connecting to a female connector (not shown). A metal center pin 108 (FIG. 4) extends through each of the connectors 100. Center pin 108 is isolated from flange 102 by insulation 110 (FIG. 4).

During assembly, flange 102 is soldered to the portion of metallized portion 42A surrounding unmetallized area 44 using solder 120 (FIG. 1).

It is understood that waveguide delay line device 10 provides a time delay for an electromagnetic signal which is initially fed through the connector (not shown) and input feed hole (not shown) of slab 50A and then propagated through the delay line 10 and, more specifically, through the respective upper and lower windows 62 and 64 of the respective walls thereof in a zigzag, alternating, or serpentine path.

The presence of plates 70 between the adjacent slabs 50A-50H serve as barriers which force the electromagnetic signal to follow a zigzag or alternating or serpentine path between the top and bottom surfaces 16 and 18 and through the respective windows 62 and 64 as the electromagnetic signal travels between the input connector and the output connector 100 coupled to end slab 50H.

The alternating winding path taken by the signal increases the length of the path which the electromagnetic signal travels and thereby also increases the time delay of the electromagnetic signal.

Method of Manufacturing a Waveguide Delay Line

A method 200 in accordance with the present invention of manufacturing the waveguide delay line 10 is described below with reference to FIGS. 2, 5A, and 5B. Method 200 initially includes forming each of the dielectric slabs or walls 50A-50H of core 12 by pressing a ceramic powder in a die or mold at step 202. A suitable binder can be added to the ceramic powder to improve binding of the powders during pressing.

Details of suitable ceramic powders for use with the present invention are disclosed in U.S. Pat. No. 6,900,150, the contents of which are herein incorporated by reference in their entirety.

The outer dielectric slabs or walls 50A and 50H are subjected to an additional operation at step 206. At step 206, the signal input and output feed holes are punched or pressed into the dielectric slabs or walls 50A and 50H using a tool such as a punch or pin. All of the dielectric slabs 50A-50H are then placed into a furnace at step 204 and fired at a temperature between about 1300 and 1400 degrees Centigrade (C.) for about 4 hours to sinter the ceramic powder into a solid block. The dielectric slabs or walls 50A-50H are then placed in a fixture and polished or lapped to create a smoother, flatter surface at step 208. The slabs 50A-50H can be polished using an abrasive media in slurry form that is applied to a pad or disc.

At step 210, the front surface 52 of each of the dielectric slabs or walls 50A-50H is coated with the layer or plate 60 of metallized material. The metal layer can be a solution that contains silver particles suspended in a medium that is applied by screen printing, spraying, plating or dipping. Use of the screen printing process to coat the surface 52 also allows the formation of the window 64.

The outer dielectric slabs or walls 50A and 50H undergo an additional process at step 214 wherein the interior surface of each of the feed holes is coated with a metal layer using a spraying or dipping process. Method 200 then proceeds to step 212.

After the interior surfaces of the feed holes in slabs 50A and 50H have been coated as described above, the dielectric slabs or walls 50A-50H and metal plates 60 are dried in a low temperature oven at about 100 degrees Centigrade (C.) for about 5 minutes in step 212. The metal layer 60 is bonded to each of the dielectric slabs 50A-50H at step 216 by placing the dielectric slabs 50A-50H in an oven at about 800 to 900 degrees Centigrade for about 30 minutes.

At step 218, the back surface 54 of each of the dielectric slabs or walls 50A-50H is coated with a layer or plate 61 of metal material. The metal layer 61 can be a solution that contains silver particles suspended in a medium that is applied by screen printing, spraying, plating or dipping. The medium may be pine oil or a terpene. Use of the screen printing process to coat the surface 54 also allows the formation of the window 62.

After coating the back surface 54, each of dielectric slabs or walls 50A-50H is dried in a low temperature oven at 100 degrees Centigrade (C.) for about 5 minutes in step 220. The metal layer 61 is permanently bonded to each of the dielectric slabs 50A-50H at step 222 by placing the dielectric slabs 50 in an oven at about 800 to 900 degrees Centigrade for about 30 minutes.

Alternatively, and in lieu of forming the windows 62 and 64 through the screen printing process as described above, it is understood that the windows 62 and 64 could be formed in surfaces 52 and 54 following step 222 using a laser ablation process as disclosed, for example, in U.S. Pat. No. 6,834,429 through which selected areas or regions of the metallized material on the front and back surfaces 52 and 54 of the slabs 50A-50H is removed therefrom to define the respective windows 62 and 64 comprising regions or areas on the slabs 50A-50H of exposed dielectric material.

At step 224, an additional layer of metal material is applied to the back surface 54 of each of the dielectric slabs or walls 50A-50H in order to allow adjacent dielectric slabs 50 to stick to each other. The dielectric slabs 50A-50H are thereafter stacked together adjacent each other to form the core 12 and placed in a fixture with applied pressure at step 226. At step 228, the core 12 is dried by being placed in an oven for about 5 minutes at about 100 degrees Centigrade.

At step 230, the core 12 is then fired in a furnace at about 800 to 900 degrees Centigrade (C.) for about 30 minutes in order to bond or fuse the slabs 50A-50H of the core 12 together.

At step 232, a layer of metal material is applied to a first side of the outer surface of the core 12 as by screen printing, spraying, or the like process. After coating at step 234, the layer of metallized material 42 on the first side is dried in a low temperature oven at about 100 degrees Centigrade (C.) for about 5 minutes.

At step 236, a layer of metal material is applied to a second side of the outer surface of the core 12 as by screen printing, spraying, or the like process. After coating at step 238, the layer of metal material on the second side of core 12 is dried in a low temperature oven at about 100 degrees Centigrade (C.) for about 5 minutes.

At step 240, a layer of metal material is applied to a third side of the outer surface of the core 12 as by screen printing, spraying, or the like. After coating at step 242, the layer of metal material on the third side is dried in a low temperature oven at about 100 degrees Centigrade (C.) for about 5 minutes.

At step 244, a layer of metal material is applied to a fourth side of the outer surface of the core 12 as by screen printing, spraying, or the like. After coating at step 246, the layer of metal material on the fourth side is dried in a low temperature oven at about 100 degrees Centigrade (C.) for about 5 minutes.

The layers of metal material applied to each of the sides of the outer surface of the core 12 in combination define metallized layer or area 42 which is bonded to all four sides of core 12 at step 248 by placing the core 12 in an oven at about 800 to 900 degrees Centigrade (C.) for about 30 minutes.

At step 250, solder paste is applied into the feed holes of slabs 50A and 50H and to the flanges 102 of the respective connectors 100 thereof. Pins 108 of connectors 100 are inserted into feed holes 80 and 84 at step 252. The core 12 and connectors 100 are then placed in a reflow furnace at step 254 where the solder paste is reflowed to attach the connectors to the ends of the core 12 in a relationship overlying the respective feed holes.

The completed waveguide delay line 10 may now be electrically tested if desired at step 256.

Figure 5A:
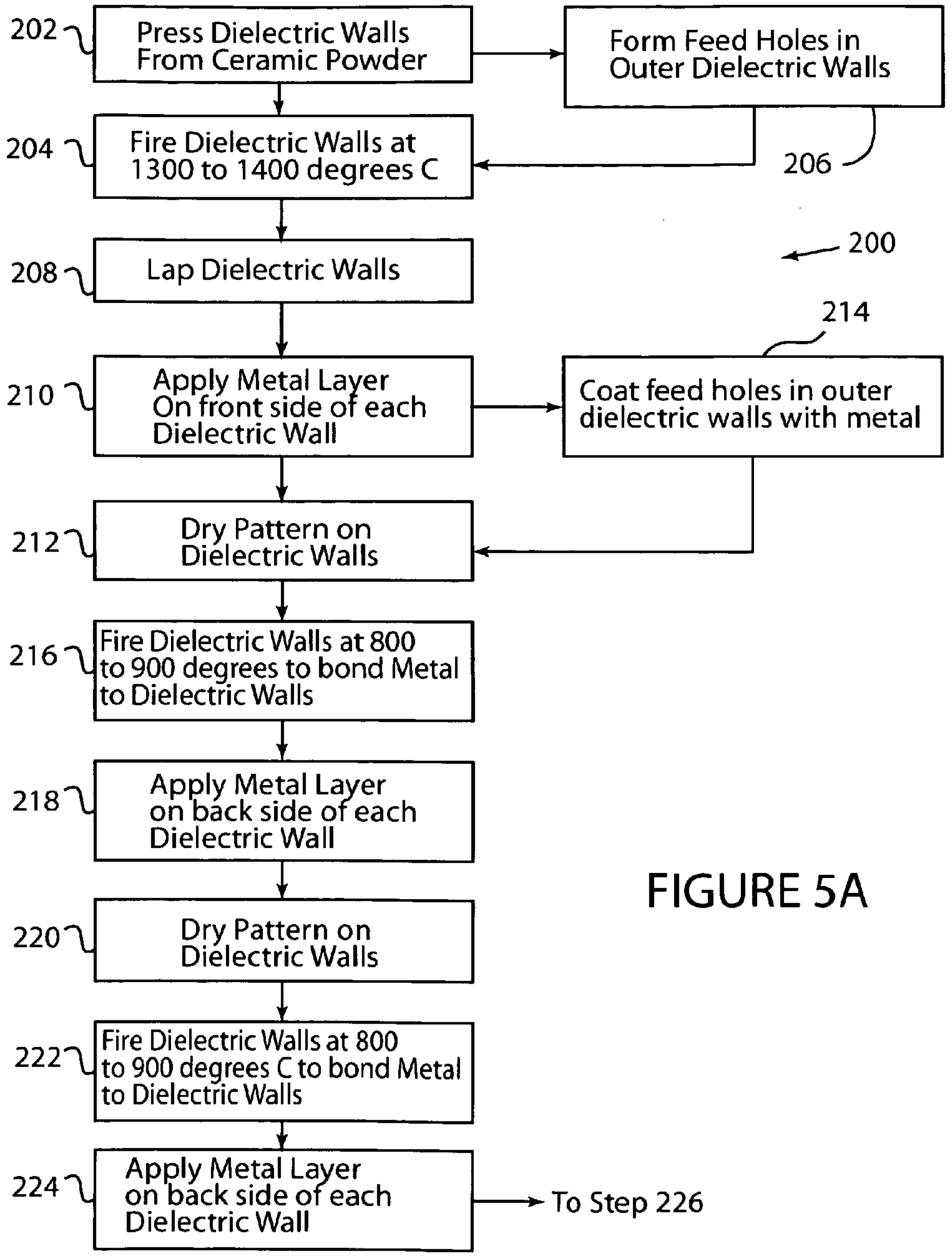
FIGS. 5A and 5B are flowcharts of the method in accordance with the present invention of manufacturing the waveguide delay line shown in FIGS. 1-4.
Figure 5B:
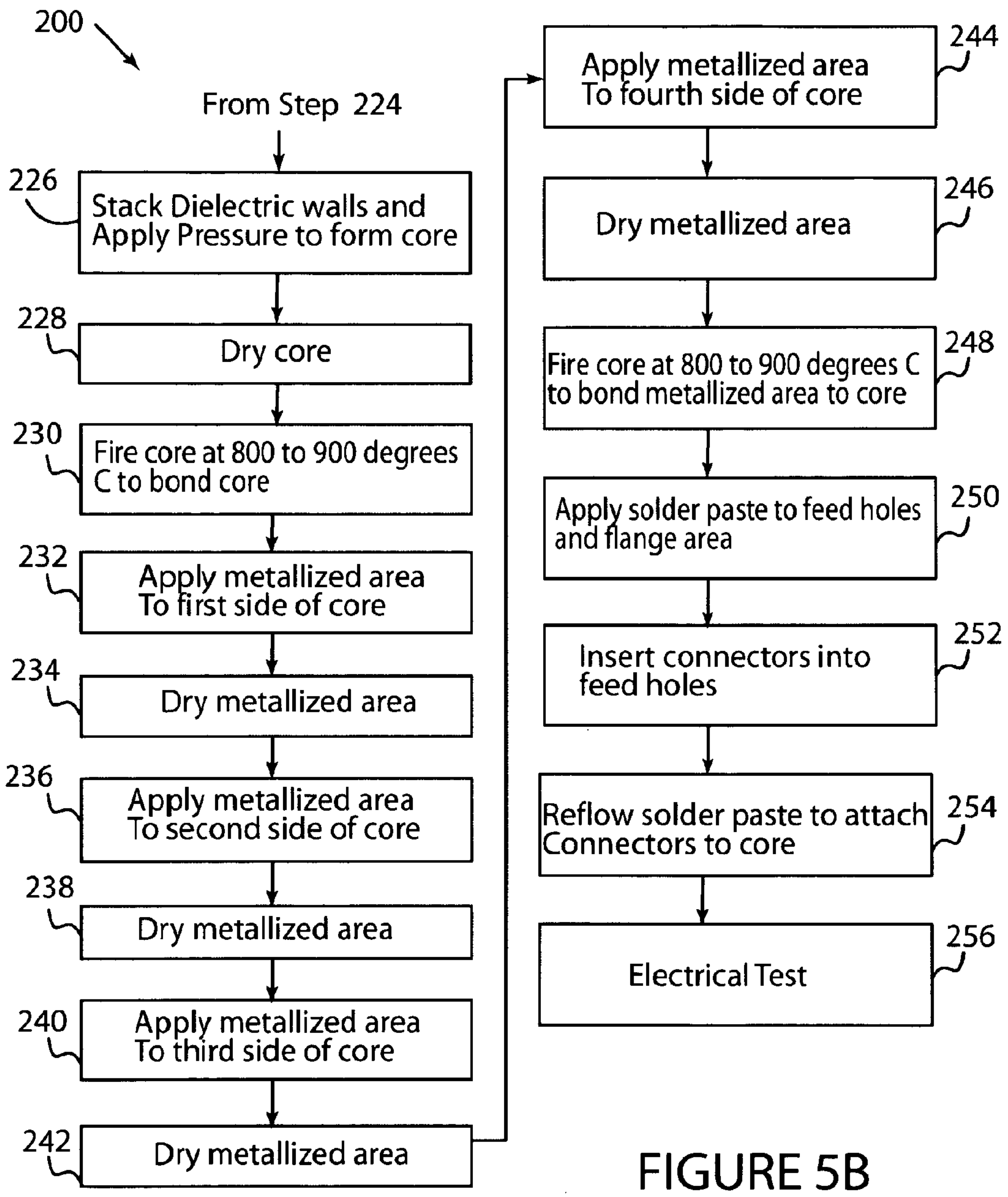

While the steps shown in FIGS. 5A and 5B are arranged in a particular order, it is understood that some of the steps in FIGS. 5A and 5B may be re-arranged in a different order or omitted altogether while still resulting in the manufacture of waveguide delay line 10 as described above.

Numerous variations and modifications of the method described above may be effected without departing from the spirit and scope of the novel features of the invention. It is to be understood that no limitations with respect to the specific method illustrated and described herein are intended or should be inferred. It is, of course, intended to cover by the appended claims all such modifications as fall within the scope of the claims.

I claim:

1. A method of making a waveguide comprising the steps of:
- providing a plurality of slices of dielectric material each having opposed outer surfaces;
- applying a layer of metal material to one of the outer surfaces of each of the plurality of slices of dielectric material;
- drying the plurality of slices of dielectric material in an oven at about 100 degrees Centigrade for about five minutes;
- applying another layer of metal material to the other of the outer surfaces of each of the plurality of slices of dielectric material;
- drying the plurality of slices of dielectric material in an oven at about 100 degrees Centigrade for about five minutes;
- firing the plurality of slices of dielectric material to fuse the layers of metal material to the dielectric material;
- stacking the plurality of slices of dielectric material together to form a core;
- drying the core;
- firing the core;
- applying at least one area of metal material on an outer surface of the core;
- drying the area of metal material on the outer surface of the core;
- firing the core; and
- attaching at least one connector to the core.

2. The method of claim 1 further comprising the step of forming areas on selected ones of the outer surfaces of selected ones of the plurality of slices of material which are devoid of metal material.

3. A method of making a wavequide comprising the steps of:
- providing a plurality of slices of dielectric material each having opposed outer layers of metal material;
- drying the layers of metal material on the plurality of slices of dielectric material;
- firing the plurality of slices of dielectric material to fuse the layers of metal material to the dielectric material;
- stacking the plurality of slices of dielectric material together to form a core;
- applying an additional layer of metal material to one of the outer surfaces of each of the plurality of slices of dielectric material between the step of firing the plurality of slices of dielectric material to fuse the layers of metal material to the dielectric material and the step of stacking the plurality of slices of dielectric material together to form a core;
- drying the core;
- firing the core;
- applying at least one area of metal material on an outer surface of the core;
- drying the area of metal material on the outer surface of the core;
- firing the core; and
- attaching at least one connector to the core.

4. A method of making a ceramic waveguide delay line comprising the steps of:
- providing a plurality of slices of dielectric material, each including a layer of metal material applied to respective opposed surfaces thereof;
- firing the plurality of slices of dielectric material in an oven to fuse the layer of metal material to the respective opposed surfaces thereof;
- stacking the plurality of slices of dielectric material together to form a core which is subsequently fired;
- applying an additional layer of metal material to one of the outer surfaces of each of the plurality of slices of dielectric material between the step of firing the plurality of slices of dielectric material to fuse the layers of metal material to the dielectric material and the step of stacking the plurality of slices of dielectric material together to form a core;
- applying an area of metal material to the outer surface of the core; and
- firing the core in an oven.

* * * * *